Nov. 6, 1951     H. V. REED     2,573,931
CLUTCH PLATE
Filed Feb. 20, 1947
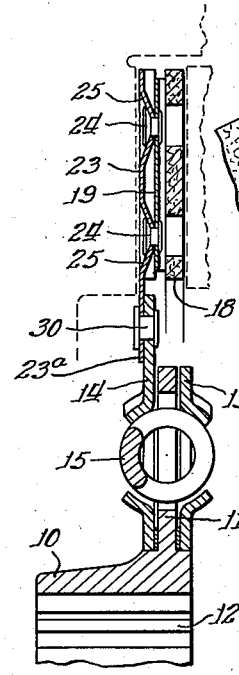
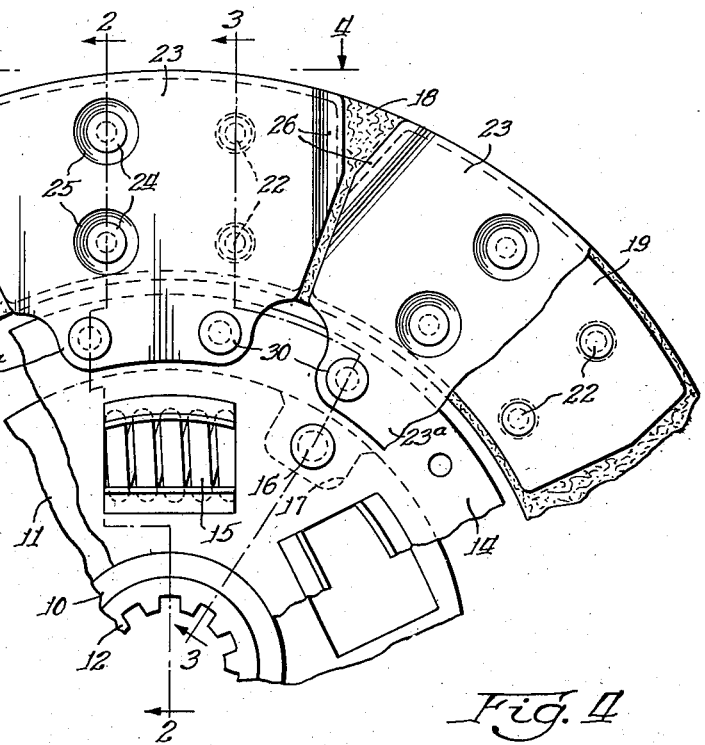
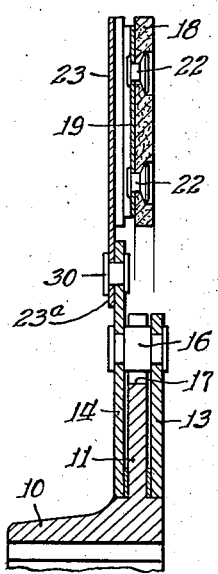
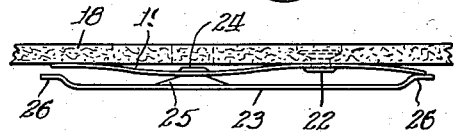
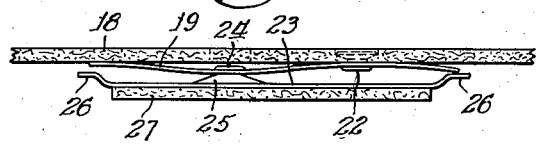
Inventor:
Harold V. Reed Patented Nov. 6, 1951

2,573,931

UNITED STATES PATENT OFFICE 2,573,931

CLUTCH PLATE

Harold V. Reed, Chicago, Ill., assignor to Borg-Warner Corporation, Chicago, Ill., a corporation of Illinois Application February 20, 1947, Serial No. 729,771

7 Claims. (Cl. 192—107)

1

The present invention relates to clutch driven plates of the type which are adapted to be packed between clutch engaging members for connecting driving and driven shafts of motor vehicles and the like.

The primary aim of this invention is to simplify the construction of clutch driven plates such as contemplated herein, and to improve the operation and efficiency of such clutch driven plates.

A principal object hereof resides in the provision of a novel and effective arrangement for mounting the friction means of a clutch plate whereby said friction means are cushioned for relative axial yieldability when packed between the driving members of a clutch assembly.

Another principal object hereof is to provide a plurality of inherently or wholly yieldable mounting devices of a composite character for attaching the clutch plate friction means on an unyielding intermediate disc-like plate which in turn is supported by the clutch hub.

Still another principal object is the provision of a clutch plate wherein at least one of the friction means comprises a plurality of non-ferrous metallic sections which are attached to an intermediate plate of the clutch assembly, each said section carrying a cushion which is secured to and supports an annular member of friction facing material.

A further object is to provide a novel composite friction facing mounting device which is fabricated from a plurality of thin sheet metal parts and which is adapted for attachment to the rim of the intermediate plate of a clutch assembly whereby to yieldably support a friction facing member of a fibrous type.

In the clutch plate arrangement contemplated herein a plurality of sheet metal composite structures are carried by a central or intermediate hub supported disc-like plate. One metal member of each composite structure is arranged to be frictionally engaged by a clutch driving member and the other member of the structure is attached to a friction facing annulus which is adapted to be engaged by the other clutch driving member. Differently stated during clutch engagement, the friction facing annulus is engaged with the clutch pressure plate and a metal member of the composite structure is in frictional contact with the flywheel.

Additional objects, aims and advantages of the invention contemplated herein will be apparent to persons skilled in the art after the construction and operation of the friction clutch plate is understood from the within description.

2

It is preferred to accomplish the numerous objects of this invention, and to practice the same, in substantially the manner hereinafter fully described and as more particularly pointed out in the appended claims, reference being had to the accompanying drawings which form a part of this specification.

In the drawings:

Fig. 1 is a fragmentary elevation of a clutch driven plate, with portions broken away, showing details of the present improvements.

Fig. 2 is a section taken along the plane of line 2—2 on Fig. 1.

Fig. 3 is a section taken along the plane of line 3—3 on Fig. 1.

Fig. 4 is a fragmentary edge view of the improved clutch plate, viewed from the plane of line 4—4 on Fig. 1.

Fig. 5 is a view similar to Fig. 4 showing a modified arrangement of the clutch driven plate contemplated herein.

The drawings are to be understood as being more or less of a diagrammatic character for the purpose of disclosing typical or preferred forms of the improvements contemplated herein, and in these drawings like reference characters identify the same parts in the different views.

The driven clutch plate shown comprises a hub assembly unit which defines the central or inner zone of said plate and includes a hub 10 which has an annular flange 11 and a splined bore 12 adapting the clutch plate for slidable axial movement on a driven shaft (not shown). Also there is included in the hub assembly unit a pair of annular washers 13 and 14 which are carried by the hub and extend outwardly therefrom on opposite sides of hub flange 11, said washers being of a non-yieldable character. It will be seen the washer 14 has a wider diameter than its companion washer 13 and it extends beyond the periphery of hub flange 11. This wide washer 14 constitutes a disc-like intermediate plate between the hub and a friction facing member 18 of annular form which is spaced outwardly from the intermediate plate to occupy the outer zone of the clutch plate. A plurality of registering openings are made in washers 13 and 14 and also in hub flange 11, in which openings compressed helical springs 15 are seated. Retainer pins 16 tie the washers 13 and 14 together for simultaneous movement and for frictional engagement with the inner region of hub flange 11, and the intermediate barrel-like body portions of said pins 16 pass through recesses 17 at the margin of hub flange 11. This arrangement permits limited relative rotative movement between the washers and the hub flange and defines a torsional vibration dampener arrangement in the hub assembly unit.

The mounting devices for the annular friction facing member 18 in this instance are preferably compound members comprising a plurality of separate wavy or undulated cushion members 19 of generally rectangular contour which are arranged in annular array alongside the facing member 18 to which they are attached by rivets 22. These cushion members are secured to carriers 23 which comprise a plurality of thin sheet metal sections or segments arranged with their major portions or outer regions alongside the cushions 19. As seen, the major portions of these carriers have approximately the same contour and dimensions as the respective cushions to which they are attached by rivets 24.

Each sheet metal carrier 23 has a smooth outer surface which confronts a smooth radial surface of a flywheel and is adapted to be moved toward and frictionally contact the flywheel surface when urged thereagainst by the conventional pressure plate when the clutch is engaged. These carriers are fabricated from a thin sheet metal stock such for example as bronze or other non-ferrous metal. For the purpose of accommodating the upset heads of rivets 24 as well as to space each carrier axially from the adjacent cushion member, said carriers have a plurality of apertured embossments 25 which extend toward the cushion members and are formed in the manner shown in Figs. 2 and 5, for receiving and seating the heads of said rivets so that said rivet-heads are set in from the outer surface of the carrier segments to prevent contact with the flywheel surface. Rivets 30 attach reduced inner regions 23a of carriers 23 to the outer marginal portion of intermediate washer plate 14.

The transverse end regions or radial margins of carriers 23 are shouldered or offset axially inward from the planes of the metal plates comprising said carriers for the purpose of providing inwardly positioned lands 26 lying alongside of and confronting the proximate ends of the undulated cushions 19. The details of this arrangement are graphically shown in Fig. 4 wherein it is apparent the left end margin of the cushion 19 contacts the friction facing member 18, whilst the right hand end margin of the cushion contacts the adjacent land 26 of the carrier. It will thus be apparent that those lands 26 on carriers 23 prevent the ends of cushions coming into direct contact with the smooth radial surface of the flywheel when the driven clutch plate is packed between the clutch driving members. Furthermore, these offset regions which define the lands 26 will also have a tendency to flatten during the final stage of the flattening movement of the cushions, thereby imparting a two stage cushioning effect to the clutch plate assembly.

It is contemplated that the plane outer surfaces of the sheet metal carriers 23, which lie close to the flywheel surface, may be coated with friction facing material 27 which is cemented to said surfaces as shown in Fig. 5, thus eliminating the use of rivets to attach the friction facing material to the forward or flywheel side of the clutch plate. Furthermore, the arrangement shown in Fig. 5 permits the use of friction facing members of thinner dimensions than is the usual practice, and also the carriers may be formed from sheet metal other than a non-ferrous metal.

In the fabrication of cushion members 19, it is preferred to separately form these parts from thin clock-spring steel stock within a range of thickness between .020" to .031", preferably .025" thick. Experimentation and tests have indicated that pre-tempered clock-spring steel, Rockwell 40-44, "C" scale, is a metal stock that is particularly well adapted for the purpose of providing the cushion members contemplated in the present improvements. Further, the carrier segments 23 of thin sheet metal stock may have certain yieldable characteristics and may be made from stock within the same range of thickness as the cushion members. Thus it is apparent these composite friction facing mounting devices are structurally separate from each other; they are of an inherently yieldable character throughout their cushion sections; and furthermore, they are of light weight whereby spinning or rotational inertia of the outer region of the clutch plate assembly has been materially reduced.

While the present invention has been disclosed in its present preferred forms or embodiments, it will be apparent to persons skilled in the art that changes and modifications may be made therein without departing from the spirit or scope thereof. It is aimed in the appended claims to cover all such changes and modifications.

I claim:

1. In a clutch driven plate, a friction facing ring and a yieldable composite structure for mounting said friction facing ring on the central disc of a clutch plate assembly to be packed between a pair of clutch driving members, said composite structure comprising a yieldable thin flat sheet metal section for attachment to a nonyielding member of the clutch plate assembly, said yieldable flat sheet metal section having a plane smooth surface for frictional engagement with a clutch driving member; apertured embossments on said flat section projecting from the side thereof opposite said plane smooth surface; a structurally separate thin yieldable undulated cushion section spaced outwardly from the central disc and lying alongside said flat section and being spaced therefrom by said embossments; and rivets anchoring said cushion section to said flat section with the rivet heads seated in said embossments, said cushion section defining the sole means for supporting said friction facing ring on the central disc in position for engagement between clutch driving members.

2. A driven clutch plate adapted to be packed between a pair of clutch driving members, comprising a hub member; a radially extending nonyielding disc-like plate carried by said hub member; an annular friction facing member spaced outward beyond the periphery of said radial plate for engagement with a clutch driving member; and a plurality of composite structures for mounting said friction facing member on said radial plate, said composite structures comprising yieldable thin flat sheet metal carrier sections attached to said radial plate and extending outward therefrom along side of and spaced axially from said friction facing member, said carrier sections having plane smooth surfaces on the sides thereof remote to said friction facing member; apertured embossments on said carrier sections projecting from the sides thereof toward said friction facing member; structurally separate thin yieldable undulated cushion sections between said carrier sections and said friction facing member and being spaced from said carrier sections by said embossments; and rivets attaching said cushion sections to said carrier sections with the rivet heads seated in said embossments, said friction facing member having axial yieldability relative to said carrier sections when packed between clutch driving members.

3. A driven clutch plate adapted to be packed between clutch driving members, said driven plate comprising a radial non-yielding disc; an annular friction facing member spaced radially outward beyond the periphery of said disc; and a plurality composite devices for mounting said facing member on said disc, said composite devices comprising a plurality of structurally independent flat carriers of thin sheet metal stock separately secured to said disc, said carriers projecting outward along side said facing member; a plurality of structurally independent undulated cushion sections spaced outward from said disc and interposed between said carriers and said facing member; means securing said cushion members to said facing member; and means securing said cushion sections to said carriers for support solely by said carriers; said composite devices being adapted under clutch packing pressure to effect relative axial yieldability of said facing member with respect to said carriers.

4. A driven clutch plate adapted to be packed between a pair of clutch driving members, comprising a hub member; a radially extending nonyielding disc-like plate carried by said hub member; an annular friction facing member spaced outward beyond the periphery of said radial plate for engagement by a clutch driving member; and a plurality of composite structures for mounting said friction facing member on said radial plate, said composite structures comprising structurally independent thin flat sheet-metal carrier sections attached to said radial plate and extending outward therefrom alongside of and spaced axially from said friction facing member; apertured embossments on said carrier sections projecting from the sides thereof toward said friction facing member; structurally separate thin yieldable undulated cushion sections between said carrier sections and said friction facing member and being spaced from said carrier sections by said embossments, said cushion sections being spaced radially outward from said disc; means attaching said friction facing member to said cushion sections; and rivets attaching said cushion sections to said carrier sections with the rivet heads seated in said embossments for supporting said cushions solely by said carriers, thereby adapting said friction facing member for axial yieldability relative to said carrier sections when packed between the clutch driving members.

5. A driven clutch plate adapted to be packed between opposed clutch driving members, said driven plate comprising a radial non-yielding disc-like plate; a single annular friction facing member spaced radially outward beyond the periphery of said radial plate; and a plurality of composite cushioning devices for mounting said facing member on said radial plate, said composite cushioning devices comprising a plurality of structurally independent flat carriers of thin yieldable sheet metal stock secured to the outer peripheral region of said radial plate, said carriers projecting outward alongside said single facing member and unattached thereto; a plurality of undulated structurally independent cushion sections of thin yieldable sheet metal stock interposed between said carriers and said single facing member; radially extending lands at the end regions of said carriers arranged in opposition to the radial end regions of said cushion sections and offset to the planes of the body portions of said carriers; means securing said cushion members to said single facing member; and means securing said cushion sections to said carriers; said composite devices under clutch packing pressure effecting relative axial yieldability of said facing member, and the flat faces of said carrier sections being adapted for frictional surface contact with a clutch driving member under clutch packing pressure.

6. A yieldable composite structure for mounting an annular friction facing member on a clutch plate assembly to be packed between clutch driving members, said composite structure comprising a structurally separate thin flat yieldable section for attachment to a non-yielding member of the clutch plate assembly, the major portion of said flat yieldable section having a plane smooth surface adapting the same for frictional engagement with a clutch driving member; and a structurally separate thin yieldable cushion section having a wavy form and attached to said flat section and adapted to support the annular friction facing member for engagement with a second clutch driving member, said flat yieldable section having apertured embossments on one side and the cushion sections being spaced from the flat section by said embossments.

7. A clutch driven plate adapted to be packed between clutch driving members, said plate comprising a rigid central disc; an annular friction facing member spaced radially outward beyond the periphery of said disc; and a plurality of yieldable composite structures for mounting said facing member on said disc; said composite structures comprising a plurality of structurally independent thin sheet metal carriers separately secured to said disc, said carriers projecting outward from said disc with their outer regions in axially spaced relation to said facing member; apertured embossments on said carriers extending towards said facing member; a plurality of structurally independent undulated cushion sections of thin yieldable sheet metal stock spaced outward from said disc and interposed between said carriers and said facing member and secured to said facing member; said embossments spacing said cushion members from the body portions of said carriers; and rivets attaching said cushion sections to said embossments for support solely by said carriers, said composite structures adapted under the clutch packing pressure to effect relative axial yieldability of said facing member with respect to said carriers.

HAROLD V. REED.

REFERENCES CITED

The following references are of record in the file of this patent:

UNITED STATES PATENTS

| Number | Name | Date |
|---|---|---|
| 2,101,411 | Nutt et al. | Dec. 7, 1937 |
| 2,264,192 | Wellman | Nov. 25, 1941 |
| 2,282,981 | Jarrett | May 12, 1942 |
| 2,309,950 | Goodwin | Feb. 2, 1943 |
| 2,321,821 | Katcher | June 15, 1943 |
| 2,327,884 | Goodwin | Aug. 24, 1943 |
| 2,333,308 | Goodwin | Nov. 2, 1943 |
| 2,448,879 | Gamble | Sept. 7, 1948 |